Oct. 14, 1941.   C. G. GLASER   2,259,160
ORTHODONTIC DEVICE
Filed Feb. 24, 1939
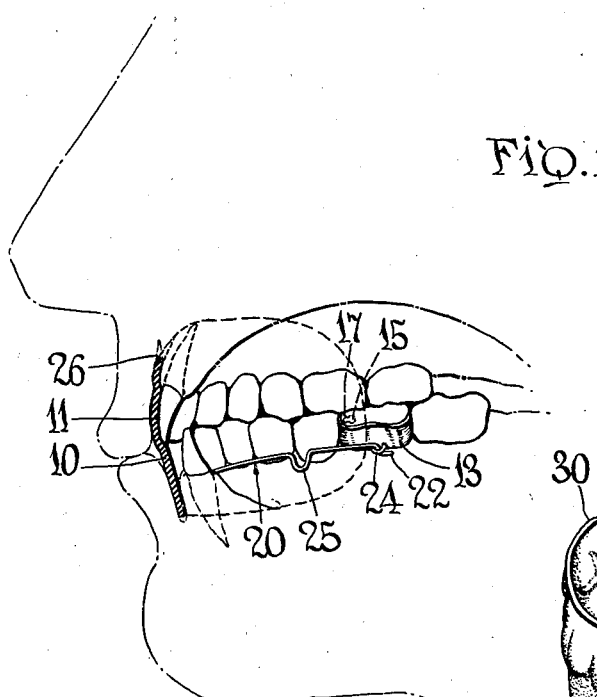
FIG.1.
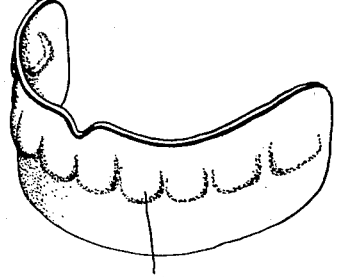
FIG.3.
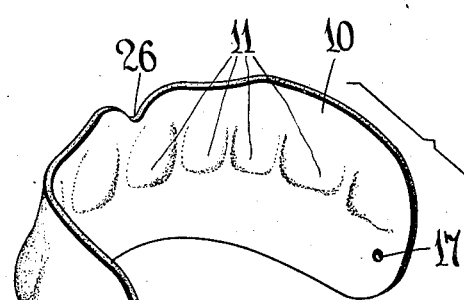
FIG.2.
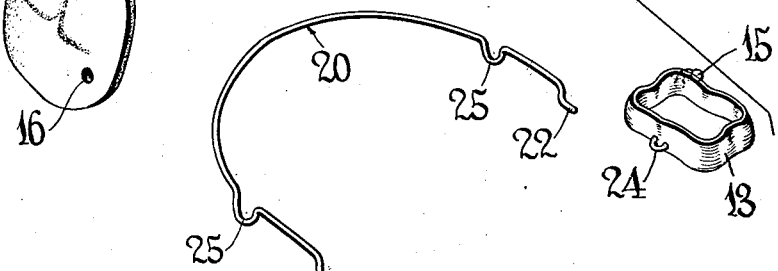
INVENTOR
CLIFFORD G. GLASER
BY
Beau, Brooks, Buckley & Beau
ATTORNEYS Patented Oct 14, 1941

2,259,160

UNITED STATES PATENT OFFICE 2,259,160

ORTHODONTIC DEVICE

Clifford G. Glaser, Buffalo, N. Y.

Application February 24, 1939, Serial No. 258,261

4 Claims. (Cl. 32—14)

This invention relates to dental appliances and more particularly to an orthodontic device.

Devices of this general class have been heretofore proposed for therapeutic treatment of misaligned teeth, which abnormality is generally referred to as malocclusion. As a generality, it is usually found in cases of malocclusion that, in addition to adjusting the position of individual teeth in the upper and lower dental arches, it is necessary to alter the relative positions of the maxilla and mandible to produce normal occlusion between the teeth of the maxillary and mandibular arches. When the lower or mandibular dental arch is too far behind with respect to the upper or maxillary dental arch, a condition of distoclusion exists. The reverse condition is called mesioclusion.

An object of the present invention is to provide a new device for causing the teeth of the user to assume proper and normal positions in order that they may occlude normally. An advantage of the present invention resides in the fact that it may be employed intermittently and to attain this advantage special means are provided, in one form of the device, for ready attachment and detachment of the device in the mouth of the user. The instant device is of such nature that its presence in the mouth of the user effects a psychological as well as a physical tendency toward normal relationship of the upper and lower arches. Even though the actual tension be very small, the tendency of the various muscles involved to relax toward a normal position will be pronounced. The use of the present invention has been found to be accompanied by highly satisfactory results in the treatment of various forms of malocclusion.

While substantial progress has been made in the development of orthodontic devices generally, such devices involve a wide variety of more or less fixed mechanical interlocks for correcting misalignment of individual teeth and the two dental arches generally. The present invention is novel in the emphasis which is placed on the psychological aspect of the subject by reason of its use. Exhaustive tests have shown that use of the device of my invention exerts a surprising influence on patients in a way that can only be ascribed to the psychological effect of the presence of the device in the mouth of a user.

Stated in one way, in the prior art the approach to the problem has been made from a purely physiological analysis of the abnormal dental formation, while in my invention the analysis of the problem is pathologically made and the therapeutics which are applied are the results of the conclusions so arrived at. Misalignment of the lips of the patient is generally the most overt symptom of a complex maladjustment. By use of a device constructed in accordance with the teachings of the present invention the patient is induced to exert an unconscious or subconscious effort to move his lips to a position of proper alignment and his dental arches to a position of proper occlusion. This unconscious effort produces sympathetic action of the heavier muscled organs involved, as the tongue and the jaw muscles.

The extreme importance of the psychological factor in this invention has been demonstrated by its effectiveness when used during waking hours as compared with its effectiveness when used during hours of sleep. Actual tests and study show that a much greater and sounder correction of dental maladjustment results when the device is employed for a given period during waking hours than when, other things being equal, the device is employed for a corresponding period during sleeping hours.

I shall first describe the operation of my invention in connection with the therapy of cases of distoclusion and reference will be had to the accompanying drawing wherein Fig. 1 is a more or less diagrammatic side elevation of a human head showing the two dental arches and the device of the present invention associated therewith; and Fig. 2 is a perspective view of the device of the present invention with the parts thereof disassembled.

Fig. 3 is a perspective view of a modified form of the device illustrated in Figs. 1 and 2.

Referring to the drawing, the numeral 10 designates a membranous element which may be formed of a somewhat flexible and preferably elastic material. Soft rubber has been found highly satisfactory. The element 10 may be initially curved to correspond approximately to the external or labial curvature of the dental arches and in the illustrated example is further provided with impressions 11 corresponding in size and disposition to normal maxillary teeth. The formation of the element may be satisfactorily accomplished by depositing latex directly into a mold, preferably under pressure to insure evenness of texture.

For supporting the element 10 in operative position bands 12 and 13 are positioned about molars at opposite sides of one of the dental arches of the wearer. The tooth encircling portions of the bands 12 and 13 are provided at their sides with hooks 14 and 15, respectively. The hooks are preferably rounded off or headed as shown in order that they may not cut or abrade the interior of the wearer's mouth.

Openings 16 and 17 are provided at opposite ends of the element 10 for engagement with the hooks 14 and 15, respectively. To relieve the torsional stress which would otherwise be exerted upon the anchoring molars due to the tension in the element 10, a brace wire 20 may be provided. The brace wire illustrated comprises a medial curved portion adapted to be disposed lingually of whichever dental arch carries the bands 12 and 13 and terminal portions 21 and 22 which engage eyes 23 and 24 provided at the lingual sides of the bands 14 and 15, respectively.

The brace 20 may be further provided with lateral deformations 25 for rendering the brace somewhat resilient axially. A central notch 26 is provided in the element 10 to avoid interference with the fraenum which extends medially between the upper lip and gums of the wearer.

Referring to Fig. 1, it will be noted that in the illustrated instance the upper portion of the element 10 is disposed against the labial side of the maxillary teeth and is held resiliently thereagainst owing to the inherent resilience of the element 10 itself and the fact that it is so proportioned as to engage the hooks 14 and 15 of the bands 12 and 13 with a predetermined initial tension. The bands 12 and 13 are shown to be associated with mandibular molars, whereby the tendency will be for the two dental arches to move relatively to each other toward a position of normal occlusion. At the same time the manner of association of the element 10 with the maxillary teeth promotes normal alignment of individual maxillary teeth and the lower portion of the element 10, being flexed by the abnormal recession of the lower lip, engages the inner side thereof and tends to lightly urge the lower lip forward. As has been stated, torsional displacement of the anchoring mandibular molars is prevented by the brace member 20.

The condition of malocclusion shown in Fig. 1 is one where the mandibular dental arch is disposed abnormally behind the maxillary arch, a case of distoclusion. It will be apparent that in the treatment of cases of mesioclusion the element 10 will be arranged to contact intimately the labial side of the mandibular arch and the anchoring bands 12 and 13 will be associated with maxillary molars. In such case the brace member 20 will be disposed lingually of the maxillary dental arch. In other words, the upper and lower formations and instrumentalities may be interchanged where reverse conditions of malocclusion so dictate.

In Fig. 3 I have illustrated a form of the device of my invention wherein no extraneous fastening means is employed and where, as a consequence, the fastener-receiving openings 16 and 17 of the device of Figs. 1 and 2 are omitted. In this form, numbered 30, the opposed lips and dental arches of the user cooperate against displacement of the device and in this form the corrective action of the device is even more markedly a persuasive rather than a coercive one. It will be obvious that the impression of individual teeth, indicated at 31, may be in the lower portion of the device, as in the case of the device of Figs. 1 and 2, when a reverse condition of maladjustment exists.

While Fig. 1 of the drawing illustrates only a device of the present invention in position in the mouth of a user, it is contemplated that devices constructed as taught herein may be used in conjunction with or as auxiliaries to other orthodontic devices, either to cumulatively correct certain maladjustments or to operate on somewhat different conditions of maladjustment.

While a specific embodiment has been herein delineated it is to be understood that my invention is in no wise limited excepting as appears from the appended claims.

I claim:

1. In a device for exerting a corrective influence against dental malocclusion, a substantially oblong resilient membranous element curved to fit vertically between the lips and the dental arches when the mouth is closed, said membranous element having an anchor part extending along its upper portion for support between the upper lip and upper dental arch of the patient, and an active part in the form of a skirt depending from the anchor part and being of supple but self-sustaining resilient material having generally the physical characteristics of soft rubber, said skirt being sufficiently resistant to deformation to exert a mild forward pressure against the lower lip for urging a misaligned dental arch to a position of correct occlusion.

2. In a device for exerting a corrective influence against dental malocclusion, a substantially oblong resilient membranous element curved to fit vertically between the lips and the dental arches when the mouth is closed, said membranous element having an anchor part extending along its upper portion for support between the upper lip and upper dental arch of the patient, and an active part in the form of a skirt depending from the anchor part and being of supple but self-sustaining resilient material having generally the physical characteristics of soft rubber, said anchor part having a series of individual tooth receiving recesses for interlockingly receiving the front faces of the teeth of the upper dental arch, said skirt being sufficiently resistant to deformation to exert a mild forward pressure against the lower lip for urging a misaligned dental arch to a position of correct occlusion.

3. In a device for exerting a corrective influence against dental malocclusion, a substantially oblong resilient membranous element curved to fit vertically between the lips and the dental arches when the mouth is closed, said membranous element having an anchor part extending along its upper portion for support between the upper lip and upper dental arch of the patient, and an active part in the form of a skirt depending from the anchor part and being of supple but self-sustaining resilient material having generally the physical characteristics of soft rubber, said anchor part having a series of individual tooth receiving recesses for interlockingly receiving the front faces of the teeth of the upper dental arch, said skirt being sufficiently resistant to deformation to exert a mild forward pressure against the lower lip for urging a misaligned dental arch to a position of correct occlusion, and means connecting the ends of the membranous element to the upper dental arch for placing the membranous element under tension about the upper dental arch to thereby effect such interlock.

4. In a device for exerting a corrective influence against dental malocclusion, a substantially oblong resilient membranous element curved to fit vertically between the lips and the dental arches when the mouth is closed, said membranous element having an anchor part extending along its upper portion for support between the upper lip and upper dental arch of the patient, and an active part in the form of a skirt depending from the anchor part and being of supple but self-sustaining resilient material having generally the physical characteristics of soft rubber, said skirt being offset rearwardly with respect to said anchor part and sufficiently resistant to deformation to exert a mild forward pressure against the lower lip for urging a misaligned dental arch to a position of correct occlusion.

CLIFFORD G. GLASER.